(12) United States Patent
Tanoue et al.

(10) Patent No.: US 9,026,027 B2
(45) Date of Patent: May 5, 2015

(54) CLEANING BLADE, PROCESS CARTRIDGE, ELECTROPHOTOGRAPHIC APPARATUS, AND POLYESTER URETHANE RUBBER

(71) Applicant: Canon Kabushiki Kaisha, Tokyo (JP)

(72) Inventors: Tomohiro Tanoue, Yokohama (JP);
Masahiro Watabe, Yokohama (JP);
Masaya Kawada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/263,881

(22) Filed: Apr. 28, 2014

(65) Prior Publication Data
US 2014/0321895 A1    Oct. 30, 2014

(30) Foreign Application Priority Data

Apr. 30, 2013  (JP) ................................. 2013-096020
Apr. 11, 2014  (JP) ................................. 2014-082054

(51) Int. Cl.
G03G 21/00 (2006.01)
C08G 63/91 (2006.01)

(52) U.S. Cl.
CPC .......... *C08G 63/916* (2013.01); *G03G 21/0011* (2013.01)

(58) Field of Classification Search
USPC ............................................... 399/101, 350
See application file for complete search history.

(56) References Cited

U.S. PATENT DOCUMENTS

| | | | |
|---|---|---|---|
| 5,168,309 A * | 12/1992 | Adachi et al. ................. | 399/350 |
| 5,438,400 A | 8/1995 | Kuribayashi et al. | |
| 6,703,472 B2 | 3/2004 | Miura et al. | |
| 2009/0003905 A1 | 1/2009 | Ueno et al. | |
| 2011/0052288 A1 | 3/2011 | Koioa | |
| 2011/0236095 A1 | 9/2011 | Aoshima | |

FOREIGN PATENT DOCUMENTS

| | | |
|---|---|---|
| JP | 2001-075451 A | 3/2001 |
| JP | 3239607 B2 | 12/2001 |
| JP | 2008-009400 A | 1/2008 |
| JP | 2008-250311 A | 10/2008 |
| JP | 2008-268670 A | 11/2008 |
| JP | 2009-025451 A | 2/2009 |
| JP | 2012-150203 A | 8/2012 |
| WO | 2011/125824 A1 | 10/2011 |

* cited by examiner

*Primary Examiner* — William J Royer
(74) *Attorney, Agent, or Firm* — Canon U.S.A. Inc., IP Division (57) ABSTRACT

A cleaning blade includes a polyester urethane rubber. In an IR spectrum measured by μATR on the surface of a contact portion of the polyester urethane rubber at which the cleaning blade comes into contact with a member to be cleaned, a ratio $(I_{SI}/I_{SE})$ of an intensity $(I_{SI})$ of a C—N peak due to an isocyanurate group included in the polyester urethane rubber to an intensity $(I_{SE})$ of a C=O peak due to an ester group included in the polyester urethane rubber is 0.65 or more and 2.50 or less. A siloxane compound is present on the surface of the contact portion of the polyester urethane rubber.

11 Claims, 3 Drawing Sheets

CLEANING BLADE, PROCESS CARTRIDGE, ELECTROPHOTOGRAPHIC APPARATUS, AND POLYESTER URETHANE RUBBER

BACKGROUND OF THE INVENTION

1. Field of the Invention

The present invention relates to a cleaning blade, a process cartridge and an electrophotographic apparatus that include the cleaning blade, and a polyester urethane rubber.

2. Description of the Related Art

Generally, when a toner image formed on the surface (outer peripheral surface) of an electrophotographic photosensitive member (hereinafter, referred to simply as "photosensitive member") is transferred to a transfer material or an intermediate transfer material, and when the toner image is further transferred from the intermediate transfer material to a transfer material, a portion of the toner (developer) is likely to remain on the surface of the photosensitive member or the intermediate transfer material. Accordingly, it is necessary to remove the toner remaining on the surface of the photosensitive member or the intermediate transfer material (hereinafter, referred to as "untransferred residual toner"). Generally, untransferred residual toners are removed using a cleaning blade.

A urethane rubber has been commonly used as a cleaning blade because a urethane rubber realizes high abrasion resistance, small permanent deformation, and the like.

Commonly, a cleaning blade is disposed so that the edge portion of the cleaning blade comes into contact with a member to be cleaned (e.g., a photosensitive member or an intermediate transfer material). A toner remaining on the surface of the member to be cleaned is scraped off with the edge portion of the cleaning blade due to the friction between the cleaning blade and the member to be cleaned and then removed from the surface of the member to be cleaned. Therefore, a friction force is generated between the cleaning blade and the member to be cleaned. A large friction force is likely to pose a risk of, for example, curling of the cleaning blade.

Japanese Patent No. 3239607 (hereinafter, referred to as "PTL 1") describes a technique of reducing the friction at a contact portion of a cleaning blade at which the cleaning blade comes into contact with a member to be cleaned by applying a siloxane compound including both a reactivity component that reacts with a urethane rubber and a lubricity component onto the inner surface of a mold used for producing the cleaning blade made of a urethane rubber and then causing the siloxane compound to adhere to the surface of the prepared (molded) urethane rubber.

Japanese Patent Laid-Open No. 2001-75451 (hereinafter, referred to as "PTL 2") describes a technique of reducing the friction at a contact portion of a cleaning blade at which the cleaning blade comes into contact with a member to be cleaned by controlling the concentration of isocyanurate groups (isocyanurate linkages) in the surface of the edge portion of the cleaning blade made of a urethane rubber to be higher than the concentration of isocyanurate groups inside the cleaning blade.

When a siloxane compound is attempted to be attached onto the surface of a urethane rubber (cleaning blade made of a urethane rubber), a siloxane compound is less likely to adhere to the surface of a urethane rubber because of the low wettability of urethane rubber. Thus, it has been difficult to realize high lubricity.

Accordingly, in the technique described in PTL 1, the adhesion between a urethane rubber and a siloxane compound is increased by adding a reactivity component that reacts with a urethane rubber to the siloxane compound.

However, as a result of studies conducted by the inventors of the present invention, it was found that, when a siloxane compound having reactivity with a urethane rubber is used, a urethane rubber may reduce the mobility of the siloxane compound, which prohibits high lubricity from being realized.

When the concentration of isocyanurate groups in the surface of the edge portion of the cleaning blade is increased as in the technique described in PTL 2, the hardness of the edge portion tends to be increased. If the hardness of the edge portion is excessively high, the cleaning blade is less capable of following the unevenness of the surface of a member to be cleaned, which increases the risk of faulty cleaning. Faulty cleaning is likely to occur particularly during cleaning of a toner having a small particle size.

SUMMARY OF THE INVENTION

Accordingly, an object of the present invention is to provide a cleaning blade in which the friction at a contact portion of the cleaning blade at which the cleaning blade comes into contact with a member to be cleaned is reduced and to provide a process cartridge and an electrophotographic apparatus that include the cleaning blade.

Another object of the present invention is to provide a urethane rubber having high wettability to a siloxane compound.

A cleaning blade according to an aspect of the present invention includes a polyester urethane rubber and is used for cleaning a surface of a member to be cleaned by being brought into contact with the member to be cleaned. In an IR spectrum measured by µATR on the surface of a contact portion of the polyester urethane rubber at which the cleaning blade comes into contact with the member to be cleaned, a ratio ($I_{SI}/I_{SE}$) of an intensity ($I_{SI}$) of a C—N peak ($1,411 \text{ cm}^{-1}$) due to an isocyanurate group included in the polyester urethane rubber to an intensity ($I_{SE}$) of a C=O peak ($1,726 \text{ cm}^{-1}$) due to an ester group included in the polyester urethane rubber is 0.65 or more and 2.50 or less. A siloxane compound represented by Structural Formula (1) is present on the surface of the contact portion of the polyester urethane rubber.

(where, $R^{11}$ to $R^{16}$ each independently represent an alkyl group having a carbon number of 1 to 4 or a phenyl group; m represents the number of repetitions of the structural unit in parenthesis; and, when m is 2 or more, m sets of $R^{12}$ may be the same as one another or may be different from one another and m sets of $R^{13}$ may be the same as one another or may be different from one another.)

A process cartridge according to another aspect of the present invention is detachably attachable to a main body of an electrophotographic apparatus and integrally supports the above-described cleaning blade and an electrophotographic photosensitive member. The surface of the electrophotographic photosensitive member is cleaned with the cleaning blade.

An electrophotographic apparatus according to another aspect of the present invention includes the above-described cleaning blade and an electrophotographic photosensitive member. The surface of the electrophotographic photosensitive member is cleaned with the cleaning blade.

A polyester urethane rubber according to another aspect of the present invention includes a polyester structure, a urethane linkage, and an isocyanurate group. In an IR spectrum measured by µATR on the surface of the polyester urethane rubber, a ratio ($I_{SI}/I_{SE}$) of an intensity ($I_{SI}$) of a C—N peak (1,411 cm$^{-1}$) due to an isocyanurate group included in the polyester urethane rubber to an intensity ($I_{SE}$) of a C=O peak (1,726 cm$^{-1}$) due to an ester group included in the polyester urethane rubber is 0.65 or more and 2.50 or less.

Further features of the present invention will become apparent from the following description of exemplary embodiments with reference to the attached drawings.

According to the present invention, a cleaning blade in which the friction at a contact portion of the cleaning blade at which the cleaning blade comes into contact with a member to be cleaned is reduced may be provided. In addition, a process cartridge and an electrophotographic apparatus that include the cleaning blade may be provided.

According to the present invention, a urethane rubber having high wettability to a siloxane compound may be provided.

DESCRIPTION OF THE EMBODIMENTS

As described above, a cleaning blade according to an embodiment of the present invention is a cleaning blade made of a polyester urethane rubber. The polyester urethane rubber according to the embodiment has a polyester structure and includes a urethane linkage and an isocyanurate group.

In this embodiment, in an IR spectrum measured by micro-attenuated total reflectance (µATR) on the surface of a contact portion of the polyester urethane rubber at which the cleaning blade comes into contact with a member to be cleaned, the ratio ($I_{SI}/I_{SE}$) of the intensity ($I_{SI}$) of the C—N peak (1,411 cm$^{-1}$) due to an isocyanurate group included in the polyester urethane rubber to the intensity ($I_{SE}$) of the C=O peak (1,726 cm$^{-1}$) due to an ester group included in the polyester urethane rubber is 0.65 or more and 2.50 or less. In an IR spectrum, the C—N peak due to an isocyanurate group appears at 1,411 cm$^{-1}$, and the C=O peak due to an ester group appears at 1,726 cm$^{-1}$. The ratio ($I_{SI}/I_{SE}$) is calculated using the intensity of the C=O peak due to an ester group, which is independent of the quantity of an isocyanurate group as a reference value. By comparing the reference value with the intensity of the C—N peak due to an isocyanurate group, the amount of isocyanurate groups can be determined qualitatively.

In this embodiment, a siloxane compound represented by Structural Formula (1) is present on the surface of the contact portion of the polyester urethane rubber at which the cleaning blade comes into contact with a member to be cleaned.

In Structural Formula (1), $R^{11}$ to $R^{16}$ each independently represent an alkyl group having a carbon number of 1 to 4 or a phenyl group; m represents the number of repetitions of the structural unit in parenthesis; and, when m is 2 or more, m sets of $R^{12}$ may be the same as one another or may be different from one another and m sets of $R^{13}$ may be the same as one another or may be different from one another.

The ratio ($I_{SI}/I_{SE}$) being 0.65 or more means that a sufficient amount of isocyanurate groups has been generated in the surface of the contact portion of the polyester urethane rubber constituting the cleaning blade, which increases the adhesion of the siloxane compound represented by Structural Formula (1) to the surface of the contact portion of the polyester urethane rubber. However, when the ratio ($I_{SI}/I_{SE}$) is excessively high, that is, when an excessively large amount of isocyanurate groups are generated in the surface of the contact portion of the polyester urethane rubber, the hardness of the contact portion tends to be increased. When the hardness of the contact portion is excessively high, the cleaning blade is less capable of following the unevenness on a member to be cleaned, which may cause faulty cleaning. Therefore, in this embodiment, the ratio ($I_{SI}/I_{SE}$) is 2.50 or less and more preferably 0.80 or more and 2.50 or less.

In the siloxane compound represented by Structural Formula (1) above, the average of m is preferably 1 to 2,500. The greater the average of m, the higher the viscosity of the siloxane compound represented by Structural Formula (1) and the higher the adhesion of the siloxane compound to the polyester urethane rubber. The less the average of m, the lower the viscosity of the siloxane compound represented by Structural Formula (1) and the higher the lubricity of the surface of the polyester urethane rubber.

In Structural Formula (1) above, $R^{11}$ to $R^{16}$ are preferably all a methyl group from the viewpoint of lubricity. A siloxane compound represented by Structural Formula (1) in which $R^{11}$ to $R^{16}$ are all a methyl group is dimethylsiloxane.

In an IR spectrum measured by µATR at an inner position 500 µm from the surface of the contact portion of the polyester urethane rubber, the ratio ($I_{II}/I_{IE}$) of the intensity ($I_{II}$) of the C—N peak (1,411 cm$^{-1}$) due to an isocyanurate group included in the polyester urethane rubber to the intensity ($I_{IE}$) of the C=O peak (1,726 cm$^{-1}$) due to an ester group included in the polyester urethane rubber is preferably 0.00 or more and 0.64 or less.

The ratio ($I_{II}/I_{IE}$) being 0.00 means that an isocyanurate groups has not been generated inside the polyester urethane rubber (specifically, at an inner position 500 µm from the surface of the polyester urethane rubber) constituting the cleaning blade. The larger the amount of isocyanurate groups inside a polyester urethane rubber, the higher the hardness of the polyester urethane rubber and the lower the elasticity of the polyester urethane rubber. The smaller the amount of the isocyanurate group inside the polyester urethane rubber, the higher the overall elasticity of the cleaning blade, which facilitates sufficient formation of the contact portion that is desirably used for removing an untransferred residual toner. Thus, in this embodiment, the ratio ($I_H/I_E$) is preferably 0.64 or less and is more preferably 0.00 or more and 0.60 or less.

Electrophotographic Apparatus

Figure 1:
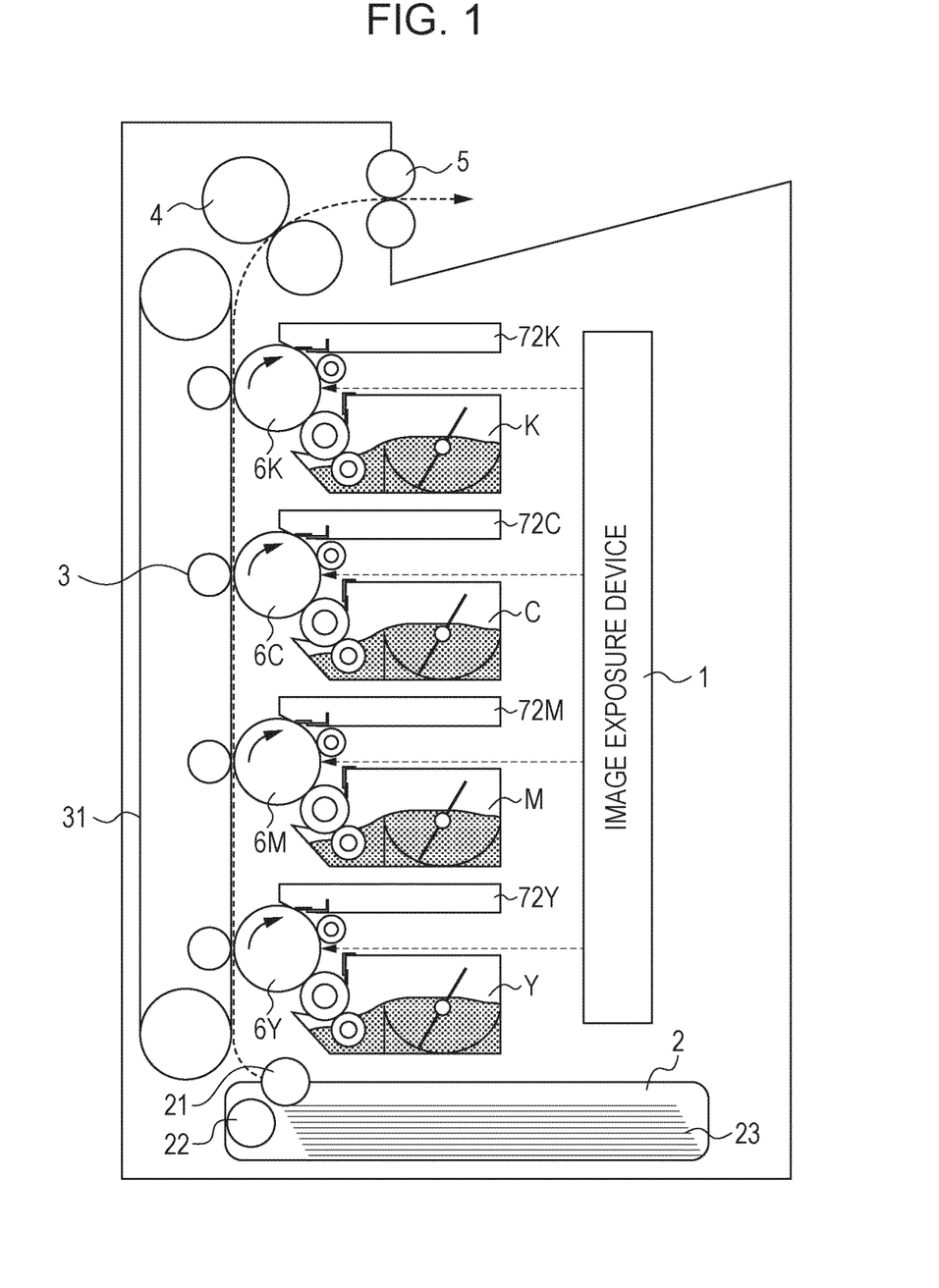
FIG. 1 is a diagram illustrating an example of an electrophotographic apparatus including a cleaning blade according to an embodiment of the present invention.

FIG. 1 is a diagram illustrating an example of an electrophotographic apparatus including the cleaning blade according to the embodiment.

The electrophotographic apparatus shown in FIG. 1 includes a process cartridge Y for yellow, a process cartridge M for magenta, a process cartridge C for cyan, and a process cartridge K for black. The process cartridges Y, M, C, and K are process cartridges used for forming toner images of a yellow toner, a magenta toner, a cyan toner, and a black toner, respectively. The electrophotographic apparatus shown in FIG. 1 further includes an image exposure device 1, a paper feed unit 2, a transfer device 3, a fixing device 4, and a paper ejection unit 5.

An image-forming method using the electrophotographic apparatus is described below.

Paper 23 serving as a transfer material is fed from the paper feed unit 2 using a paper feed roller 21 and a paper feed pad 22 and transported to the paper ejection unit 5 in the upward direction (the direction of the dashed arrow) in FIG. 1 using a transfer material conveyance belt 31 bearing the paper 23. Meanwhile, a yellow toner image formed on the surface of a photosensitive member 6Y, a magenta toner image formed on the surface of a photosensitive member 6M, a cyan toner image formed on the surface of a photosensitive member 6C, and a black toner image formed on the surface of a photosensitive member 6K are successively transferred onto the surface of the paper 23. The toner images are transferred from the surfaces of the photosensitive members 6Y, 6M, 6C, and 6K into the surface of the paper 23 due to a transfer bias. The photosensitive members 6Y, 6M, 6C, and 6K are photosensitive members for yellow, magenta, cyan, and black, respectively, and have a drum-like (cylindrical) shape.

The yellow toner, magenta toner, cyan toner, and black toner used in the electrophotographic apparatus shown in FIG. 1 are all a toner having the property of being negatively charged (i.e., negatively chargeable toner). The photosensitive members 6Y, 6M, 6C, and 6K are photosensitive members for negatively charging the toners.

In order to attract the yellow, magenta, cyan, and black toner images formed on the photosensitive members 6Y, 6M, 6C, and 6K to the paper 23, a positive bias (i.e., transfer bias) is applied to the transfer material conveyance belt 31. Each toner image attracted by the transfer bias adheres to the surface of the paper 23, and subsequently the paper 23 is transported to the next transfer unit of another color. In this manner, the yellow, magenta, cyan, and black toner images are successively superimposed on top of one another. Thus, a full-color toner image is formed.

Portions of toners that are not transferred and remain on the surfaces of the respective photosensitive members 6Y, 6M, 6C, and 6K (i.e., untransferred residual toners) are scraped off with respective cleaning blades 71Y, 71M, 71C, and 71K. The cleaning blades are arranged to come into contact with the surfaces of the photosensitive members 6Y, 6M, 6C, and 6K, respectively. The scraped-off untransferred residual toners are collected in a waste-toner container 72Y for yellow, a waste-toner container 72M for magenta, a waste-toner container 72C for cyan, and a waste-toner container 72K for black, respectively.

The paper 23, on which the full-color toner image is formed, is then transported to the fixing device 4. In the fixing device 4, the full-color toner image formed on the surface of the paper 23 is pinched with a pair of rollers, which is disposed in a fixing unit and controlled to be at a predetermined temperature and a predetermined pressure, and is then heated and pressed. At this time, the toners constituting the full-color toner image are fused and mixed among paper fibers, then cooled by passing through the fixing unit, and are thereby fixed to the surface of the paper. The paper 23, to which the full-color toner image is fixed, is ejected outward from the electrophotographic apparatus through the paper ejection unit 5.

In this manner, a cycle of an image-forming process is completed.

To continuously form an image, the process is successively repeated.

Process Cartridge

Figure 2:
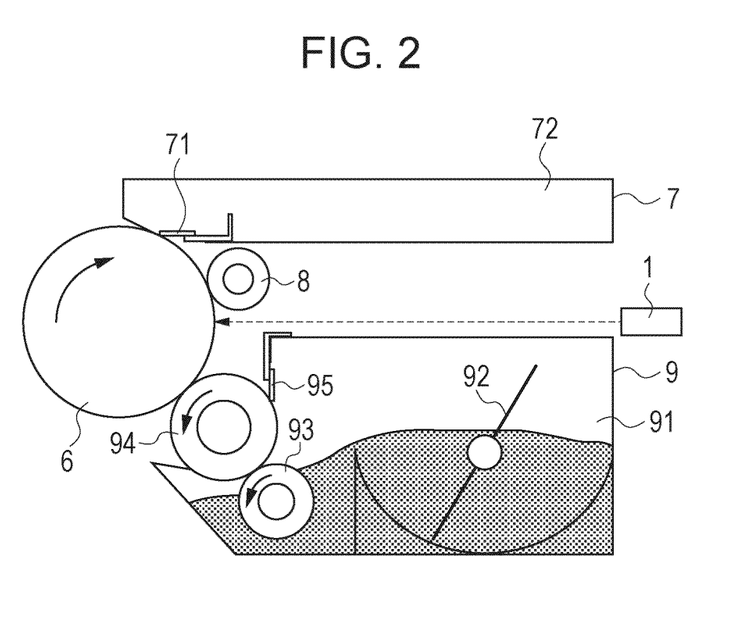
FIG. 2 is a diagram illustrating an example of a process cartridge including a cleaning blade according to an embodiment of the present invention.

FIG. 2 is a diagram illustrating an example of a process cartridge including the cleaning blade according to the embodiment.

The process cartridge shown in FIG. 2 includes a photosensitive member (electrophotographic photosensitive member) 6 having a drum-like (cylindrical) shape. The process cartridge further includes a charging device 8, a developing device 9, and a cleaning device 7, which are disposed around the photosensitive member 6. The charging device 8, the developing device 9, and the cleaning device 7 are integrally supported together with the photosensitive member 6 and thereby constitute the process cartridge. The process cartridge shown in FIG. 2 is detachably attachable to a main body of an electrophotographic apparatus.

A charging roller serving as the charging device 8 is placed to be in contact with the surface of the photosensitive member 6 so as to rotate with the rotation of the photosensitive member 6. Upon application of a predetermined bias to the charging roller, an electric discharge is generated due to a difference in potentials between the surface of the charging roller and the surface of the photosensitive member 6, which causes the surface of the photosensitive member 6 to be charged.

The charged surface of the photosensitive member 6 is transported to an image-exposure unit due to the rotation of the photosensitive member 6. In the image-exposure unit, portions of the surface of the photosensitive member 6 are irradiated with image-exposure light, which reduces the absolute value of the potential at the irradiated portions. These irradiated portions form an electrostatic latent image on the surface of the photosensitive member 6 in combination with the other portions (portions that are not irradiated with the image-exposure light) in which the absolute value of the potential is not reduced.

An example of a light source of an image exposure device 1 is a semiconductor laser. When a light source of the image exposure device 1 is a semiconductor laser, the surface of the photosensitive member 6 is scanned with a laser beam that is emitted on the basis of an image pattern and reflected by a rapidly rotating polygon mirror.

The cleaning device 7 includes a cleaning blade 71 and a waste-toner container 72. The cleaning blade 71 comes into contact with the surface of the photosensitive member 6 at a predetermined angle and pressure and thereby allows an untransferred residual toner to be scraped off from the surface of the photosensitive member 6. The scraped-off untransferred residual toner is accommodated in the waste-toner container 72.

Developing Device

The developing device 9 serves to develop an electrostatic latent image to form a toner image. The four developing devices included in the electrophotographic apparatus shown in FIG. 1 have the same structure except that the developing devices accommodate toners of different colors.

The developing device 9 included in the process cartridge shown in FIG. 2 includes a toner container 91 that accommodates a toner. An impeller 92 disposed inside the toner container 91 serves to stir the toner by rotating and thereby serves to transport the toner to the vicinity of a developer-supplying roller 93. The developer-supplying roller 93 serves to supply the toner onto a developing roller 94 and to remove a portion of the toner that is not developed and remains on the developing roller 94. The toner supplied onto the developing roller 94 is then transported into a control unit due to the rotation of the developing roller 94, and the thickness of the toner deposited on the developing roller 94 is controlled using a control blade 95. Thus, a toner layer having a uniform thickness is formed. At this time, the toner becomes charged by being rubbed between the control blade 95 and the developing roller 94. An approximately intermediate potential between the potential at a portion (irradiated portion) of the surface of the photosensitive member 6 which is irradiated with image-exposure light and the potential at a portion (non-irradiated portion) of the surface of the photosensitive member 6 which is not irradiated with image-exposure light is applied to the developing roller 94 using an external power source. Thereby, in a developing unit, the toner layer on the developing roller 94 is transferred onto the surface of the photosensitive member 6, and thus an electrostatic latent image is developed.

Cleaning Blade

Figure 3:
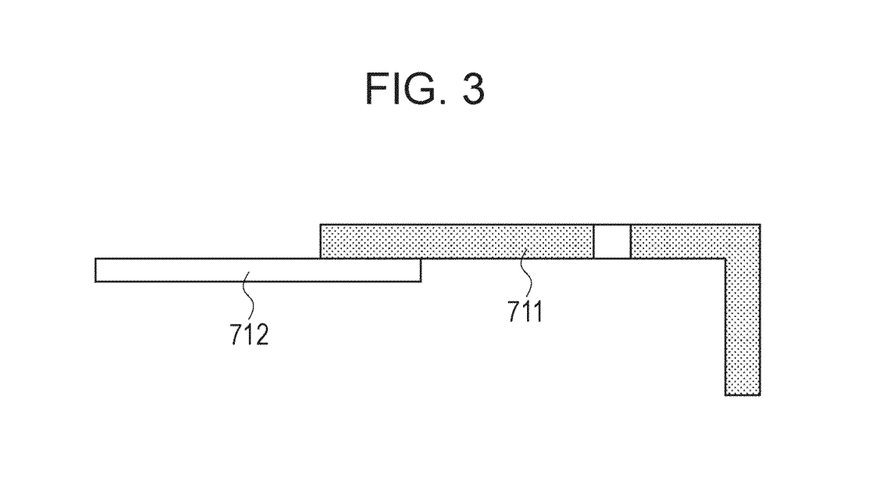
FIG. 3 is a diagram illustrating an example of a cleaning member including a cleaning blade according to an embodiment of the present invention.

FIG. 3 is a diagram illustrating an example of a cleaning member including the cleaning blade according to the embodiment.

The cleaning member shown in FIG. 3 includes a metal plate 711 made of iron having a thickness of 1 mm and a cleaning blade 712 made of a polyester urethane rubber having a thickness of 2 mm, which are adhered to each other.

An example of a method for preparing a polyester urethane rubber plate in order to prepare a cleaning blade made of a polyester urethane rubber is described.

A mold made of iron is heated in an oven until the temperature of the surface of the mold reaches a predetermined temperature. In order to impart lubricity to the surface of the polyester urethane rubber plate, the siloxane compound represented by Structural Formula (1) described above may be applied onto the inner surface of the mold.

Furthermore, a release agent, which is used for facilitating releasing the produced polyester urethane rubber plate from the mold, and a catalyst (catalyst solution) containing a urethane-rubber-synthesis catalyst may also be applied onto the inner surface of the mold.

For example, the following two types of compositions may be used as raw materials of the polyester urethane rubber:

(1) a first composition prepared by reacting a polyisocyanate with a first aliphatic polyester polyol having a number-average molecular weight of 2,000 to 3,500 in such a manner that the number of moles of the first aliphatic polyester polyol is 20 to 40 mol % of the number of moles of the polyisocyanate; and (2) a second composition including a second aliphatic polyester polyol having a number-average molecular weight of 2,000 to 3,500, which is the same as or different from the first aliphatic polyester polyol, and a urethane-rubber-synthesis catalyst.

Examples of the polyisocyanate used for preparing the first composition include 4,4'-diphenylmethane diisocyanate (MDI), 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), carbodiimide-modified MDI, and polymethylenephenyl polyisocyanate (PAPI). Among these polyisocyanates, 4,4'-diphenylmethane diisocyanate (MDI) may be preferably used.

Examples of the first aliphatic polyester polyol used for preparing the first composition include ethylene-butylene adipate polyester polyol, butylene adipate polyester polyol, hexylene adipate polyester polyol, and lactone-based polyester polyol. These aliphatic polyester polyols may be used in a mixture of two or more. Among these aliphatic polyester polyols, butylene adipate polyester polyol and hexylene adipate polyester polyol are preferably used because they have a high degree of crystallinity. The higher the degree of crystallinity of the aliphatic polyester polyol, the higher the hardness of the resulting polyester urethane rubber (i.e., cleaning blade made of the polyester urethane rubber), which enhances the durability of the cleaning blade.

The number-average molecular weight of the first aliphatic polyester polyol used for preparing the first composition is preferably 2,000 to 3,500 and is more preferably 2,000 to 3,000. The same is true in the case where two or more types of aliphatic polyester polyols are used in a mixture.

Examples of the second aliphatic polyester polyol used for preparing the second composition include ethylene-butylene adipate polyester polyol, butylene adipate polyester polyol, hexylene adipate polyester polyol, and lactone-based polyester polyol. These aliphatic polyester polyols may be used in a mixture of two or more. Among these aliphatic polyester polyols, butylene adipate polyester polyol and hexylene adipate polyester polyol are preferably used because they have a high degree of crystallinity. The higher the degree of crystallinity of the aliphatic polyester polyol, the higher the hardness of the resulting polyester urethane rubber (i.e., cleaning blade made of the polyester urethane rubber), which enhances the durability of the cleaning blade.

The number-average molecular weight of the second aliphatic polyester polyol used for preparing the second composition is preferably 2,000 to 3,500 and is more preferably 2,000 to 3,000. The same is true in the case where two or more types of aliphatic polyester polyols are used in a mixture.

The second aliphatic polyester polyol may be the same as or different from the first aliphatic polyester polyol.

The overall number-average molecular weight for the first aliphatic polyester polyol and the second aliphatic polyester polyol is preferably 2,000 to 3,500 and is more preferably 2,000 to 3,000. The larger the overall number-average molecular weight for all aliphatic polyester polyols, the higher the hardness of the resulting polyester urethane rubber (cleaning blade made of a polyester urethane rubber). The smaller the overall number-average molecular weight, the lower the viscosity of a mixture of the first composition and the second composition, which facilitates handling of the mixture.

The types of the urethane-rubber-synthesis catalyst used for preparing the second composition are broadly divided into the following two groups: urethanizing catalysts (urethanization-promoting catalyst) that promote formation of rubber (resinification) and foaming; and isocyanurating catalysts (isocyanate trimerization catalyst). In this embodiment, these catalysts may be used in a mixture.

Examples of the urethanizing catalysts include tin-based urethanizing catalysts such as dibutyltin dilaurate and stannous octoate; and amine-based urethanizing catalysts such as triethylenediamine, tetramethylguanidine, pentamethyldiethylenetriamine, dimethylimidazole, tetramethylpropanediamine, and N,N,N'-trimethylaminoethylethanolamine. In this embodiment, these urethanizing catalysts may be used in a mixture. Among these urethanizing catalysts, triethylenediamine is preferably used because it particularly promotes the urethane reaction.

Examples of the isocyanurating catalysts include metal oxides such as $Li_2O$ and $(Bu_3Sn)_2O$; hydride compounds such as $NaBH_4$; alkoxide compounds such as $NaOCH_3$, KO-(t-Bu), and a borate; amine compounds such as $N(C_2H_5)_3$, $N(CH_3)_2CH_2C_2H_5$, and $N_2C_6H_{12}$; alkaline carboxylate compounds such as $HCO_2Na$, $CO_3Na_2$, $PhCO_2Na/DMF$, $CH_3CO_2K$, $(CH_3CO_2)_2Ca$, alkaline soap, and a naphthenate; alkaline formate compounds; and quaternary ammonium salt compounds such as $((R^1)_3—NR^2OH)—OOCR^3$. Examples of a cocatalyst used as the isocyanurating catalyst include an amine-epoxide, an amine-carboxylic acid, and an amine-alkylene imide. In this embodiment, these isocyanurating catalysts may be used in a mixture.

Among these urethane-rubber-synthesis catalysts, N,N,N'-trimethylaminoethylethanolamine is preferably used. N,N,N'-trimethylaminoethylethanolamine serves both as a urethanizing catalyst and as an isocyanurating catalyst when used in the production method according to the embodiment.

The first composition and the second composition are heated to 60° C. to 80° C. Predetermined amounts of the first composition and the second composition are weighed and mixed with each other. The resulting mixture is injected into a mold that has been heated to a predetermined temperature. After a lapse of a predetermined time, the resulting polyester urethane rubber is removed from the mold.

The first composition, the second composition, and the like may include, as needed, additives such as a pigment, a plasticizer, a water-proofing agent, an antioxidant, an ultraviolet absorber, and a photostabilizer.

Method for Determining Number-Average Molecular Weight

The number-average molecular weight is determined by gel permeation chromatography (GPC) using monodisperse polystyrene for GPC. The number-average molecular weight is calculated by an ordinary method on the basis of a calibration curve between the number of peaks in the chromatogram of the monodisperse polystyrene and the number-average molecular weight of the monodisperse polystyrene. Specifically, in this embodiment, the number-average molecular weight of an aliphatic polyester polyol is determined by dissolving the aliphatic polyester polyol in tetrahydrofuran (solvent) and measuring the dissolved component using the following equipment and the like under the following conditions.

GPC equipment: "HLC-8120GPC" produced by TOSOH CORPORATION
Columns: "TSK-GEL", "G-5000HXL", "G-4000HXL", "G-3000HXL", and "G-2000HXL" produced by TOSOH CORPORATION
Detector: differential refractometer
Solvent: tetrahydrofuran
Solvent concentration: 0.5 mass %
Flow rate: 1.0 ml/min Method for Determining Hardness (Rubber Hardness)

In this embodiment, the hardness (rubber hardness) of the cleaning blade made of a polyester urethane rubber (i.e., polyester urethane rubber) is determined using a micro rubber hardness tester "MD-1 capa Type A" produced by KOBUN-SHI KEIKI CO., LTD. The average of the hardness measured at three randomly selected points in a contact portion of the cleaning blade at which the cleaning blade comes into contact with a member to be cleaned is considered to be the hardness of the cleaning blade made of a polyester urethane rubber (i.e., polyester urethane rubber).

The hardness (rubber hardness) of the polyester urethane rubber is preferably 75° to 86°. The hardness (rubber hardness) of the cleaning blade made of a polyester urethane rubber is preferably 75° to 86° at least in the contact portion.

Method for Determining IR Spectrum by µATR (Micro-Attenuated Total Reflectance)

Figure 4:
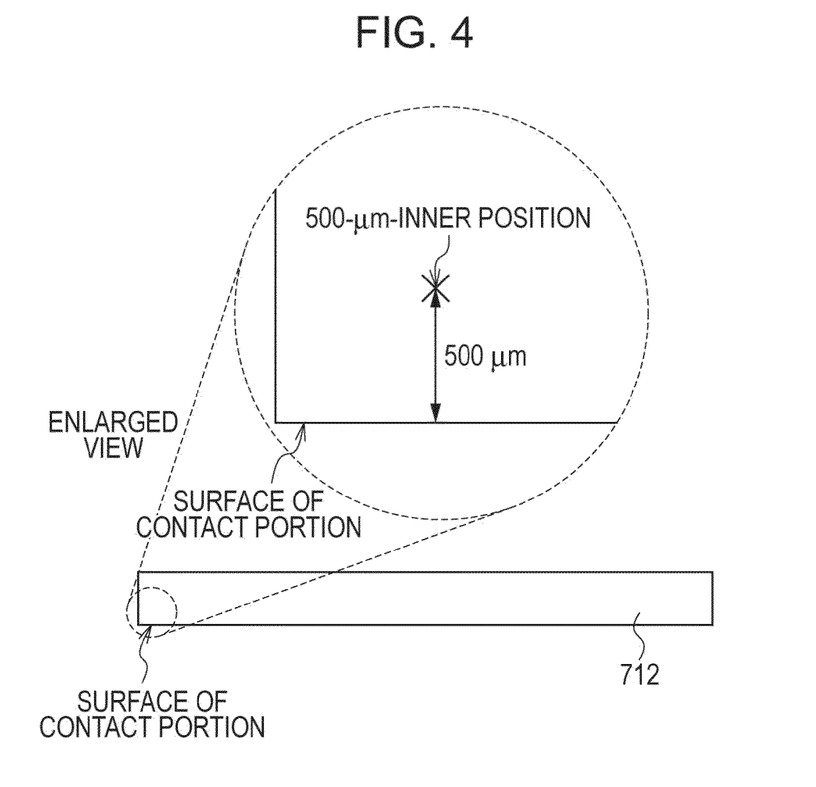
FIG. 4 is a diagram illustrating a position at which an FT-IR measurement is made by µATR.

FIG. 4 is a diagram illustrating a position at which a Fourier transform infrared spectroscopy (FT-IR) measurement is made by µATR.

In FIG. 4, the caption "500-µm-inner position" refers to an inner position 500 µm from the surface of a contact portion of the polyester urethane rubber at which the cleaning blade 712 made of a polyester urethane rubber comes into contact with a member to be cleaned. The caption "surface of a contact portion" refers to the surface of the contact portion of the polyester urethane rubber at which the cleaning blade 712 comes into contact with a member to be cleaned.

An infrared (IR) spectroscopy is performed by µATR with Fourier transform infrared spectrometer "FTS-7000" and infrared microscope "UMA600" produced by Varian, Inc. using germanium as a µATR crystal under the following conditions: a resolution of 2 $cm^{-1}$, measured spectrum range of 4,000 to 650 $cm^{-1}$, and the number of scans being 4 times.

EXAMPLES

The present invention is described with reference to Examples below. In Examples, the term "part" means "part by mass".

Example 1

A quaternary ammonium carboxylate "DABCO TMR" produced by Air Products and Chemicals, Inc. which serves as an isocyanurating catalyst and dimethylsiloxane "KF-96A-6CS" produced by Shin-Etsu Chemical Co., Ltd. (a siloxane compound represented by Structural Formula (1) described above in which $R^{11}$ to $R^{16}$ were a methyl group and the average of m was 1 to 2,500) were mixed at the mass ratio of 1:1 to prepare a mixture. The mixture was applied onto the inner surface of a mold made of iron by blade coating. The mold was then heated in an oven until the temperature of the inner surface of the mold reached 150° C.

The following two types of compositions were prepared as raw materials of the polyester urethane rubber:

(1) a first composition containing 7.2 mass % of NCO groups, which was prepared by reacting 299 parts of 4,4'-diphenylmethane diisocyanate (MDI) with 767.5 parts of butylene adipate polyester polyol having a number-average molecular weight of 2,600 at 80° C. for 3 hours; and (2) a second composition prepared by adding 0.25 parts of N,N,N'-trimethylaminoethylethanolamine serving as a urethane-rubber-synthesis catalyst to 250 parts of hexylene adipate polyester polyol having a number-average molecular weight of 2,000 and stirring the resulting mixture for 1 hour at 60° C.

The first composition and the second composition were heated to 80° C., and 80 parts of the first composition and 20 parts of the second composition were charged into a planetary centrifugal vacuum mixer "ARV-310" produced by THINKY CORPORATION. The first and second compositions were mixed with each other and deaerated using the planetary centrifugal vacuum mixer at a rotation rate of 2,000 rpm and a pressure of 0.2 kPa for 2 minutes and then immediately injected into the mold. After 30 minutes had elapsed from the injection of the mixed composition into the mold, the resulting composition was released from the mold. Thus, a polyester urethane rubber plate was prepared.

The polyester urethane rubber plate had a hardness (rubber hardness) of 75.5°, the ratio $I_{SI}/I_{SE}$ of 0.85, and the ratio $I_{II}/I_{IE}$ of 0.57.

Dimethylsiloxane, which was applied onto the inner surface of the mold, was transferred and adhered to the surface of the polyester urethane rubber plate. Isocyanurate groups were generated in the surface of the polyester urethane rubber plate which was in contact with the inner surface of the mold. The concentration of the isocyanurate groups continuously decreased in the direction from the surface of the polyester urethane rubber plate toward the inside of the polyester urethane rubber plate and became constant at a depth of 200 μm from the surface of the polyester urethane rubber plate.

Figure 5:
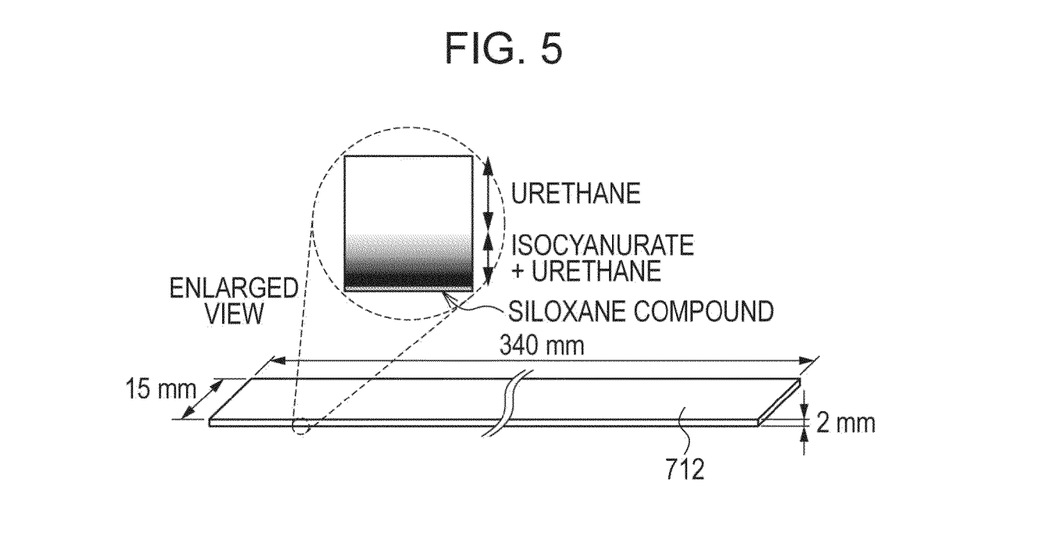
FIG. 5 is a diagram illustrating an example of a cleaning blade according to an embodiment of the present invention.

FIG. 5 is a diagram illustrating an example of a cleaning blade according to an embodiment of the present invention.

In FIG. 5, the caption "urethane" indicates a region of the cleaning blade 712 made of a polyester urethane rubber in which a polyester structure and a urethane linkage are mainly present. The caption "isocyanurate+urethane" indicates a region of the cleaning blade 712 in which a polyester structure, a urethane linkage, and an isocyanurate group are mainly present. The caption "siloxane compound" indicates a siloxane compound represented by Structural Formula (1) shown above. As shown in FIG. 5, a sufficient amount of isocyanurate groups are generated in the surface (the lower surface in FIG. 5) of the cleaning blade 712, and a siloxane compound represented by Structural Formula (1) is present on the surface of the cleaning blade 712. In the example shown in FIG. 5, the concentration of the isocyanurate groups continuously decreases in the direction from the surface of the polyester urethane rubber plate toward the inside of the polyester urethane rubber plate and becomes constant at a depth of 200 μm from the surface of the polyester urethane rubber plate.

The polyester urethane rubber plate was cut into a piece having dimensions of 340 mm×15 mm×2 mm to prepare a cleaning blade made of a polyester urethane rubber. This piece was adhered to a metal plate made of iron having a thickness of 1 mm. Thus, a cleaning member was prepared.

The cleaning blade made of a polyester urethane rubber had the same hardness (rubber hardness), the same ratio $I_{SI}/I_{SE}$, and the same ratio $I_{II}/I_{IE}$ as those of the polyester urethane rubber plate.

The cleaning member was installed in a process cartridge, and the process cartridge was then mounted in an electrophotographic apparatus. The cleaning member was evaluated in terms of cleaning property using the electrophotographic apparatus. Curling of the cleaning blade did not occur at an early stage of use. Passing of a toner during cleaning also did not occur.

Example 2

A polyester urethane rubber plate was prepared as in Example 1 except that the mold was heated in the oven until the temperature of the inner surface of the mold reached 130° C. (i.e., the target temperature was changed from 150° C. to 130° C.). A cleaning blade made of a polyester urethane rubber was prepared as in Example 1 except that the polyester urethane rubber plate prepared in Example 2 was used. A cleaning member was prepared using the cleaning blade prepared in Example 2.

The polyester urethane rubber plate (i.e., cleaning blade made of a polyester urethane rubber) had a hardness (rubber hardness) of 83.3°, the ratio $I_{SI}/I_{SE}$ of 2.10, and the ratio $I_{II}/I_{IE}$ of 0.56.

The cleaning member was evaluated in terms of cleaning property as in Example 1. Curling of the cleaning blade did not occur at an early stage of use. Passing of a toner during cleaning also did not occur.

Example 3

A polyester urethane rubber plate was prepared as in Example 1 except that the mold was heated in the oven until the temperature of the inner surface of the mold reached 110° C. (i.e., the target temperature was changed from 150° C. to 110° C.). A cleaning blade made of a polyester urethane rubber was prepared as in Example 1 except that the polyester urethane rubber plate prepared in Example 3 was used. A cleaning member was prepared using the cleaning blade prepared in Example 3.

The polyester urethane rubber plate (i.e., cleaning blade made of a polyester urethane rubber) had a hardness (rubber hardness) of 85.9°, the ratio $I_{SI}/I_{SE}$ of 1.86, and the ratio $I_{II}/I_{IE}$ of 0.53.

The cleaning member was evaluated in terms of cleaning property as in Example 1. Curling of the cleaning blade did not occur at an early stage of use. Passing of a toner during cleaning also did not occur.

Comparative Example 1

A polyester urethane rubber plate was prepared as in Example 1 except that only dimethylsiloxane was applied onto the inner surface of the mold made of iron by blade coating in Comparative Example 1. A cleaning blade made of a polyester urethane rubber was prepared as in Example 1 except that the polyester urethane rubber plate prepared in Comparative Example 1 was used. A cleaning member was prepared using the cleaning blade prepared in Comparative Example 1.

The polyester urethane rubber plate (i.e., cleaning blade made of a polyester urethane rubber) had a hardness (rubber hardness) of 72.3°, the ratio $I_{SI}/I_{SE}$ of 0.51, and the ratio $I_{II}/I_{IE}$ of 0.52.

The cleaning member was evaluated in terms of cleaning property as in Example 1. Curling of the cleaning blade occurred as soon as the photosensitive member started rotating. This was presumably due to considerably high friction between the cleaning blade and the photosensitive member. The reason for the high friction was presumably that a sufficient amount of isocyanurate groups were not generated in the surface of the polyester urethane rubber constituting the cleaning blade and consequently a sufficient amount of dimethylsiloxane, which was applied onto the inner surface of the mold, was not transferred to the cleaning blade, which prohibited the friction between the cleaning blade and the photosensitive member (member to be cleaned with the cleaning blade) at the contact portion from being reduced by a sufficient degree.

Comparative Example 2

A cleaning blade made of a urethane rubber was prepared as in Example 1 of PTL 2 except that the dimensions of the cleaning blade were changed to 340 mm×15 mm×2 mm. The cleaning blade was adhered to a metal plate made of iron having a thickness of 1 mm. Thus, a cleaning member was prepared.

The polyester urethane rubber plate (i.e., cleaning blade made of a polyester urethane rubber) had a hardness (rubber hardness) of 90.0°, the ratio $I_{SI}/I_{SE}$ of 5.00, and the ratio $I_{II}/I_{IE}$ of 0.53.

The cleaning member was evaluated in terms of cleaning property as in Example 1. Curling of the cleaning blade did not occur at an early stage of use. However, during cleaning, the toner partly passed through the cleaning blade and remained on the surface of the photosensitive member in the form of streaks. This is presumably because the hardness of the cleaning blade was excessively high and, as a result, the cleaning blade was less capable of following the unevenness of the surface of the photosensitive member that was to be cleaned, which created gaps through which the toner passed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096020 filed Apr. 30, 2013 and No. 2014-082054 filed Apr. 11, 2014, which are hereby incorporated by reference herein in their entirety.

What is claimed is:

1. A cleaning blade comprising a polyester urethane rubber, the cleaning blade being used for cleaning a surface of a member to be cleaned by being brought into contact with the member to be cleaned,
   wherein, in an IR spectrum measured by μATR on the surface of a contact portion of the polyester urethane rubber at which the cleaning blade comes into contact with the member to be cleaned, a ratio ($I_{SI}/I_{SE}$) of an intensity ($I_{SI}$) of a C—N peak (1,411 cm$^{-1}$) due to an isocyanurate group included in the polyester urethane rubber to an intensity ($I_{SE}$) of a C═O peak (1,726 cm$^{-1}$) due to an ester group included in the polyester urethane rubber is 0.65 or more and 2.50 or less,
   wherein a siloxane compound represented by Structural Formula (1) is present on the surface of the contact portion of the polyester urethane rubber, (1)

where, $R^{11}$ to $R^{16}$ each independently represent an alkyl group having a carbon number of 1 to 4 or a phenyl group; m represents the number of repetitions of the structural unit in parenthesis; and, when m is 2 or more, m sets of $R^{12}$ may be the same as one another or may be different from one another and m sets of $R^{13}$ may be the same as one another or may be different from one another.

2. The cleaning blade according to claim 1, wherein the ratio ($I_{SI}/I_{SE}$) is 0.80 or more and 2.50 or less.

3. The cleaning blade according to claim 1, wherein, in an IR spectrum measured by μATR at an inner position 500 μm from the surface of the contact portion of the polyester urethane rubber at which the cleaning blade comes into contact with the member to be cleaned, a ratio ($I_{II}/I_{IE}$) of an intensity ($I_{II}$) of a C—N peak (1,411 cm$^{-1}$) due to an isocyanurate group included in the polyester urethane rubber to an intensity ($I_{IE}$) of a C═O peak (1,726 cm$^{-1}$) due to an ester group included in the polyester urethane rubber is 0.00 or more and 0.64 or less.

4. The cleaning blade according to claim 3, wherein the ratio ($I_{II}/I_{IE}$) is 0.00 or more and 0.60 or less.

5. The cleaning blade according to claim 1, wherein, in Structural Formula (1), $R^{11}$ to $R^{16}$ are all a methyl group.

6. The cleaning blade according to claim 1, wherein a hardness of the cleaning blade is 75° to 86° at least at the contact portion.

7. A process cartridge detachably attachable to a main body of an electrophotographic apparatus, the process cartridge integrally supporting:
   the cleaning blade according to claim 1; and
   an electrophotographic photosensitive member, a surface of the member being cleaned with the cleaning blade.

8. An electrophotographic apparatus comprising:
   the cleaning blade according to claim 1; and
   an electrophotographic photosensitive member, a surface of the member being cleaned with the cleaning blade.

9. A polyester urethane rubber comprising:
   a polyester structure;
   a urethane linkage; and
   an isocyanurate group,
   wherein, in an IR spectrum measured by μATR on the surface of the polyester urethane rubber, a ratio ($I_{SI}/I_{SE}$) of an intensity ($I_{SI}$) of a C—N peak (1,411 cm$^{-1}$) due to an isocyanurate group included in the polyester urethane rubber to an intensity ($I_{SE}$) of a C═O peak (1,726 cm$^{-1}$) due to an ester group included in the polyester urethane rubber is 0.65 or more and 2.50 or less.

10. The polyester urethane rubber according to claim 9, wherein the ratio ($I_{SI}/I_{SE}$) is 0.80 or more and 2.50 or less.

11. The polyester urethane rubber according to claim 9, wherein a hardness of the polyester urethane rubber is 75° to 86°.

* * * * *